Patented June 30, 1942

2,288,195

UNITED STATES PATENT OFFICE 2,288,195

RUBBER COMPOSITION HAVING HIGH FLEX-RESISTANCE AND LOW HYSTERESIS

Paul C. Jones, Silver Lake, and Warren E. Phillips, Cuyahoga Falls, Ohio, assignors to The B. F. Goodrich Company, New York, N. Y., a corporation of New York No Drawing. Application October 17, 1940,
Serial No. 361,616

11 Claims. (Cl. 260—788)

This invention relates to rubber compositions having improved physical properties and to a method of preparing the same.

It is known that the incorporation of magnesium oxide in rubber compositions produces a remarkable increase in resistance to cracking when the compositions are flexed, the improvement being especially pronounced at high temperatures. It has been observed, however, that the use of magnesium oxide imparts certain undesirable properties to rubber compositions vulcanized in the presence of ordinary commercial accelerators such as the aldehyde-amines, the dithiocarbamates, and the mercapto arylene thiazoles. Thus rubber stocks containing ordinary rubber-sulfur ratios exhibit greatly increased hysteresis and permanent set when cured in the presence of one of these accelerators and magnesium oxide. It has not been possible, therefore, to take advantage of the improved resistance to flex-cracking imparted to rubber by magnesium oxide.

It is the principal object of this invention to provide a method whereby rubber compositions may be vulcanized in the presence of magnesium oxide to produce compositions which have greatly improved resistance to flex-cracking, but which do not possess the undesirable characteristics ordinarily resulting from the use of magnesium oxide.

This object is attained by vulcanizing a rubber composition containing magnesium oxide in the presence of a mixture of accelerators, one accelerator being selected from the class consisting of substituted thiuram sulfides and N,N'-thioamines, and the other accelerator being selected from the class consisting of mercaptothiazoles and mercaptothiazolines and their derivatives.

The substituted thiuram sulfides and N,N'-thioamines constitute a well-known class of accelerators including such compounds as tetramethyl thiuram monosulfide, tetramethyl thiuram disulfide, tetraethyl thiuram disulfide, tetraphenyl thiuram tetrasulfide, tetracyclohexyl thiuram disulfide, dipentamethylene thiuram tetrasulfide, N,N'-trithiodiethylamine, N,N'-dithiodiethylamine, N,N'-tetrathiomorpholine, N,N'-trithio-n-butylamine, and other substituted thiuram sulfides and N,N'-thioamines. Substituted thiuram sulfides and N,N'-thioamines may in general be considered as derived from the same class of amines, particularly strongly basic secondary amines, the thiuram sulfides by reaction with carbon disulfide in the presence of oxidizing agents and the N,N'-thioamines by reaction with sulfur chloride. Furthermore, both thiuram disulfides and N,N'-thioamines are characterized by the fact that during vulcanization, they decompose with the liberation of sulfur available for the vulcanization.

As examples of accelerators which are mercaptothiazolines and mercaptothiazoles or derivatives thereof may be mentioned 2-mercapto-4,5-dimethylthiazole, 2-mercapto-4-ethylthiazole, 2-mercaptobenzothiazole, 2-mercaptonaphthothiazole, di-2-benzothiazyl disulfide, and 2-mercaptothiazoline, 2-mercapto-4,5-dimethylthiazoline, and the zinc salt of 2-mercaptothiazoline.

These two classes of accelerators are ordinarily included in the rubber compositions in proportions by weight of from about 1:3 to 3:1. The total accelerator concentration is ordinarily about the concentration which would normally be employed if a mercaptothiazole such as 2-mercapto-4,5-dimethylthiazole, for instance, were employed as the sole accelerator in the composition. When mercaptothiazolines are employed as one of the accelerators, it is particularly important that fatty acid should be present as an activator as is well understood by those skilled in the art.

The magnesium oxide employed may be a light or heavy grade of the commercially-available material, and ordinarily produces the maximum improvement in properties when incorporated in the rubber composition in small amounts, as from .1% to 3% based on rubber, for instance, although the use of the accelerator combinations of this invention permits the use of magnesium oxide in even higher quantities if desired.

To demonstrate the excellent properties attainable by using the accelerators of this invention, various accelerator combinations were employed in a composition containing the following ingredients:

| | Parts by weight |
|---|---|
| Rubber | 60.75 |
| Carbon black | 31.80 |
| Zinc oxide | 1.90 |
| Pine tar | 0.90 |
| Cottonseed fatty acid | 1.80 |
| Sulfur | 0.45 |
| Antioxidant | 0.60 |
| Magnesia | 0.60 |

Hysteresis test blocks were then cured for 75' at 300° F., and were tested for hysteresis and permanent set by the method described by Lessig, Ind. & Eng. Chem., Analyt. Ed. vol. 9, p. 582 (1937). The results are tabulated below:

| Accelerators used | Parts by weight | Temp. rise (°F.) during flexure at 212° F. | Permanent set (%) at 212° F. |
|---|---|---|---|
| Dipentamethylene thiuram tetrasulfide | .60 | 41 | 4.8 |
| 2-mercaptothiazoline | .60 | | |
| Dipentamethylene thiuram tetrasulfide | .60 | 36 | 3.8 |
| Zinc salt of 2-mercaptothiazoline | .60 | | |
| Dipentamethylene thiuram tetrasulfide | .60 | 46 | 6.0 |
| Benzothiazyl-2-sulfene-cyclohexyl amide | .60 | | |
| Tetramethyl thiuram monosulfide | .60 | 48 | 6.2 |
| Di-4,5-dimethylthiazyl disulfide | .60 | | |

The above vulcanizates, because of the presence of the magnesium oxide, had superior resistance to tearing at high temperatures and resisted the development of cracks due to repeated flexing from four to twenty times as well as standard vulcanizates, yet they exhibited a lower hysteresis than many standard vulcanizates which do not contain magnesium oxide. Similar results are obtained by employing N,N'-thioamines such as N,N'-tetrathiomorpholine and N,N'-trithiodiethylamine in place of the substituted thiuram sulfides in the above examples.

Although the above compositions are low-sulfur vulcanizates, the method of this invention in equally applicable to stocks containing larger percentages of sulfur, in which case lower proportions of accelerator will in general be employed.

It is to be understood that the term "a rubber" is employed in the appended claims in a generic sense to include caoutchouc, balata, guttapercha, latex, synthetic rubbers which are vulcanizable with sulfur, and the like.

The terms "substituted thiuram sulfides" and "N,N'-thioamines," unless otherwise limited, are employed herein to include the substituted thiuram mono- and polysulfides and the N,N'-mono- and polythioamines.

While we have herein described specific embodiments of our invention, we do not intend to limit the invention solely thereto, for it will be obvious to those skilled in the art that many modifications are within the spirit and scope of the invention as defined in the appended claims.

We claim:

1. The process which comprises vulcanizing a rubber in the presence of a fatty acid and of two accelerators present in proportions of from about 1:3 to 3:1 and magnesium oxide, one of the accelerators being selected from the class consisting of substituted thiuram sulfide and N,N'-thioamine accelerators and the other accelerator being selected from the class consisting of 2-mercaptothiazolines and zinc salts thereof.

2. The process which comprises vulcanizing a rubber in the presence of a fatty acid and of two accelerators present in proportions of from about 1:3 to 3:1 and magnesium oxide, one of the accelerators being a substituted thiuram polysulfide accelerator and the other accelerator being a 2-mercaptothiazoline.

3. The process which comprises vulcanizing a rubber in the presence of a fatty acid and of two accelerators present in approximately equal proportions and magnesium oxide, one of the accelerators being a substituted thiuram polysulfide and the other accelerator being 2-mercaptothiazoline.

4. The process which comprises vulcanizing a rubber in the presence of a fatty acid and of dipentamethylene thiuram tetrasulfide and 2-mercaptothiazoline present in approximately equal proportions and magnesium oxide.

5. The process which comprises vulcanizing a rubber in the presence of a fatty acid and of two accelerators present in approximately equal proportions and magnesium oxide, one of the accelerators being a substituted thiuram polysulfide and the other accelerator being the zinc salt of 2-mercaptothiazoline.

6. The process which comprises vulcanizing a rubber in the presence of a fatty acid and of dipentamethylene thiuram tetrasulfide and the zinc salt of 2-mercaptothiazoline present in approximately equal proportions and magnesium oxide.

7. A composition comprising a rubber which has been vulcanized in the presence of a fatty acid and of two accelerators present in proportions of from about 1:3 to 3:1 and magnesium oxide, one of the accelerators being a substituted thiuram polysulfide accelerator and the other accelerator being selected from the class consisting of 2-mercaptothiazolines and zinc salts thereof.

8. A composition comprising a rubber which has been vulcanized in the presence of a fatty acid and of two accelerators present in approximately equal proportions and magnesium oxide, one of the accelerators being a substituted thiuram polysulfide and the other accelerator being 2-mercaptothiazoline.

9. A composition comprising a rubber which has been vulcanized in the presence of a fatty acid and of dipentamethylene thiuram tetrasulfide and 2-mercaptothiazoline present in approximately equal proportions and magnesium oxide.

10. A composition comprising a rubber which has been vulcanized in the presence of a fatty acid and of two accelerators present in approximately equal proportions and magnesium oxide, one of the accelerators being a substituted thiuram polysulfide and the other accelerator being the zinc salt of 2-mercaptothiazoline.

11. A composition comprising a rubber which has been vulcanized in the presence of a fatty acid and of dipentamethylene thiuram tetrasulfide and the zinc salt of 2-mercaptothiazoline present in approximately equal proportions and magnesium oxide.

PAUL C. JONES.
WARREN E. PHILLIPS.